US009529902B2

(12) United States Patent
Qu et al.

(10) Patent No.: US 9,529,902 B2
(45) Date of Patent: *Dec. 27, 2016

(54) HAND HELD BAR CODE READERS OR MOBILE COMPUTERS WITH CLOUD COMPUTING SERVICES

(71) Applicant: Honeywell International Inc., Fort Mill, SC (US)

(72) Inventors: Huyu Qu, San Jose, CA (US); Ynjiun P. Wang, Cupertino, CA (US)

(73) Assignee: Honeywell International, Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,728

(22) Filed: Dec. 28, 2015

(65) Prior Publication Data

US 2016/0171098 A1    Jun. 16, 2016

Related U.S. Application Data

(63) Continuation of application No. 14/467,262, filed on Aug. 25, 2014, now Pat. No. 9,223,860, which is a continuation of application No. 13/941,908, filed on Jul. 15, 2013, now Pat. No. 8,820,630, which is a continuation of application No. 13/312,465, filed on Dec. 6, 2011, now Pat. No. 8,485,430.

(51) Int. Cl.
| G06K 7/10 | (2006.01) |
| G06F 17/00 | (2006.01) |
| G06F 19/00 | (2011.01) |
| G06F 17/30 | (2006.01) |
| G06Q 30/02 | (2012.01) |
| G06K 7/14 | (2006.01) |

(52) U.S. Cl.
CPC ....... *G06F 17/30725* (2013.01); *G06K 7/1439* (2013.01); *G06Q 30/02* (2013.01)

(58) Field of Classification Search
USPC ..... 235/375, 462.45, 462.46, 462.01–472.03
See application file for complete search history.

(56) References Cited

U.S. PATENT DOCUMENTS

| 6,618,709 B1 * | 9/2003 | Sneeringer ......... G06Q 30/0283 705/400 |
| 6,659,344 B2 | 12/2003 | Otto et al. |
| 7,003,138 B2 | 2/2006 | Wilson |
| (Continued) | | |

OTHER PUBLICATIONS

EPC Global, Specification for RFID Air Interface, EPC Radio-Frequency Identity Protocols Class-1 Generation-2 UHF RFID Protocol for Communications at 860 MHz-960 MHz, Version 1.0.9, Jan. 31, 2005, pp. 1-94.

*Primary Examiner* — Tuyen K Vo
(74) *Attorney, Agent, or Firm* — Additon, Higgins & Pendleton, P.A.

(57) ABSTRACT

A data decoding system that includes a server-side proxy component and at least two back-end computers, where the server-side proxy component is configured, when it receives an encoding request from a client, to select a back-end computer to forward the encoding request to, based on either a pre-defined rule, load estimates for the at least two computers, estimated network throughputs across network paths to the two computers. In response to receiving this request, the back-end computer that is selected is configured to encode the request.

20 Claims, 11 Drawing Sheets

(56) References Cited

U.S. PATENT DOCUMENTS

| | | | |
|---|---|---|---|
| 7,015,967 B1 | 3/2006 | Kochi et al. | |
| 7,159,770 B2 | 1/2007 | Onozu | |
| 7,237,721 B2 | 7/2007 | Bilcu et al. | |
| 7,287,696 B2 | 10/2007 | Attia et al. | |
| 7,308,158 B2 | 12/2007 | Herbert et al. | |
| 7,405,662 B2 | 7/2008 | Steinke et al. | |
| 7,407,096 B2 | 8/2008 | McQueen et al. | |
| 7,419,097 B2 * | 9/2008 | Lee | G06F 17/30879 235/454 |
| 7,480,737 B2 * | 1/2009 | Chauffour | H04L 29/06 709/219 |
| 7,494,063 B2 | 2/2009 | Kotlarsky et al. | |
| 7,501,950 B2 | 3/2009 | Suzuki | |
| 7,535,361 B2 | 5/2009 | Doan et al. | |
| 7,551,090 B2 | 6/2009 | Doan et al. | |
| 7,602,288 B2 | 10/2009 | Broussard | |
| 7,627,191 B2 | 12/2009 | Xu et al. | |
| 7,677,602 B2 | 3/2010 | Bennett et al. | |
| 7,696,874 B2 | 4/2010 | Stevens | |
| 7,702,187 B2 | 4/2010 | Rusman et al. | |
| 7,708,205 B2 | 5/2010 | Kotlarsky et al. | |
| 7,735,731 B2 | 6/2010 | Skaaksrud et al. | |
| 7,756,292 B2 | 7/2010 | Lev | |
| 7,756,319 B2 | 7/2010 | Odell | |
| 7,786,865 B2 | 8/2010 | Park | |
| 7,786,925 B1 | 8/2010 | Knibbe et al. | |
| 7,815,121 B2 | 10/2010 | Kotlarsky et al. | |
| 7,821,400 B2 | 10/2010 | Tabet et al. | |
| 7,831,082 B2 | 11/2010 | Holsing et al. | |
| 7,831,912 B2 | 11/2010 | King et al. | |
| 7,855,643 B2 | 12/2010 | Tuttle | |
| 7,861,936 B2 | 1/2011 | Kotlarsky et al. | |
| 7,870,999 B2 | 1/2011 | Skaaksrud et al. | |
| 7,883,013 B2 | 2/2011 | Skaaksrud et al. | |
| 7,886,972 B2 | 2/2011 | Skaaksrud et al. | |
| 7,950,698 B2 | 5/2011 | Popadic et al. | |
| 7,951,003 B2 | 5/2011 | Russell et al. | |
| 7,961,908 B2 | 6/2011 | Tzur et al. | |
| 7,965,186 B2 | 6/2011 | Downie et al. | |
| 7,988,050 B2 | 8/2011 | Kitada et al. | |
| 8,046,311 B2 | 10/2011 | Ferraro et al. | |
| 8,079,525 B1 | 12/2011 | Zolotov | |
| 8,087,583 B2 | 1/2012 | Hawes | |
| 8,115,601 B2 | 2/2012 | Nonaka | |
| 8,120,818 B2 | 2/2012 | Nagata | |
| 8,139,117 B2 | 3/2012 | Dwinell et al. | |
| 8,139,249 B2 | 3/2012 | Venable | |
| 8,149,094 B2 | 4/2012 | Deoalikar et al. | |
| 8,256,664 B1 | 9/2012 | Balfanz et al. | |
| 8,485,430 B2 | 7/2013 | Qu et al. | |
| 9,223,860 B2 | 12/2015 | Qu et al. | |
| 2001/0047426 A1 | 11/2001 | Hunter | |
| 2002/0165758 A1 | 11/2002 | Hind et al. | |
| 2005/0212817 A1 | 9/2005 | Cannon et al. | |
| 2005/0283448 A1 * | 12/2005 | Dixon | G06F 17/30879 705/408 |
| 2006/0262961 A1 | 11/2006 | Holsing et al. | |
| 2006/0266836 A1 | 11/2006 | Bilcu et al. | |
| 2007/0008136 A1 | 1/2007 | Suzuki | |
| 2007/0102506 A1 | 5/2007 | Stevens | |
| 2007/0199995 A1 | 8/2007 | Kotlarsky et al. | |
| 2007/0215706 A1 | 9/2007 | Kotlarsky et al. | |
| 2008/0037899 A1 | 2/2008 | Xu et al. | |
| 2008/0061937 A1 | 3/2008 | Park | |
| 2008/0111661 A1 | 5/2008 | Lin et al. | |
| 2008/0164313 A1 | 7/2008 | Kotlarsky et al. | |
| 2008/0164317 A1 | 7/2008 | Kotlarsky et al. | |
| 2008/0169343 A1 | 7/2008 | Skaaksrud et al. | |
| 2008/0172303 A1 | 7/2008 | Skaaksrud et al. | |
| 2008/0173706 A1 | 7/2008 | Skaaksrud et al. | |
| 2008/0173710 A1 | 7/2008 | Skaaksrud et al. | |
| 2008/0203147 A1 | 8/2008 | Skaaksrud et al. | |
| 2008/0203166 A1 | 8/2008 | Skaaksrud et al. | |
| 2008/0210749 A1 | 9/2008 | Skaaksrud et al. | |
| 2008/0210750 A1 | 9/2008 | Skaaksrud et al. | |
| 2008/0224870 A1 | 9/2008 | Yeo et al. | |
| 2008/0247363 A1 | 10/2008 | Lee et al. | |
| 2008/0285091 A1 | 11/2008 | Skaaksrud et al. | |
| 2009/0021353 A1 | 1/2009 | Nanaka | |
| 2009/0040025 A1 | 2/2009 | Volpi et al. | |
| 2009/0045913 A1 | 2/2009 | Nelson et al. | |
| 2009/0045924 A1 | 2/2009 | Roberts et al. | |
| 2009/0065566 A1 * | 3/2009 | Lee | G06F 17/30879 235/375 |
| 2009/0109484 A1 | 4/2009 | Honda | |
| 2009/0121025 A1 | 5/2009 | Romanchik | |
| 2009/0161964 A1 | 6/2009 | Tzur et al. | |
| 2009/0190183 A1 | 7/2009 | Hosoda | |
| 2009/0214137 A1 | 8/2009 | Takahashi | |
| 2009/0218405 A1 | 9/2009 | Joseph et al. | |
| 2009/0242620 A1 | 10/2009 | Sahuguet | |
| 2009/0243801 A1 | 10/2009 | Strzelczyk | |
| 2009/0245755 A1 | 10/2009 | Lee et al. | |
| 2009/0300106 A1 | 12/2009 | Woodside et al. | |
| 2009/0307232 A1 | 12/2009 | Hall | |
| 2009/0322537 A1 | 12/2009 | Tapp et al. | |
| 2010/0045436 A1 | 2/2010 | Rinkes | |
| 2010/0046842 A1 | 2/2010 | Conwell | |
| 2010/0048242 A1 | 2/2010 | Rhoads et al. | |
| 2010/0072269 A1 | 3/2010 | Scott et al. | |
| 2010/0073487 A1 | 3/2010 | Sogoh et al. | |
| 2010/0084470 A1 | 4/2010 | Scott et al. | |
| 2010/0091313 A1 | 4/2010 | Kitada et al. | |
| 2010/0109903 A1 | 5/2010 | Carrick | |
| 2010/0142825 A1 | 6/2010 | Maxwell et al. | |
| 2010/0148985 A1 | 6/2010 | Lin et al. | |
| 2010/0163632 A1 | 7/2010 | Tseng et al. | |
| 2010/0187311 A1 | 7/2010 | van der Merwe et al. | |
| 2010/0189367 A1 | 7/2010 | van der Merwe et al. | |
| 2010/0200660 A1 | 8/2010 | Moed et al. | |
| 2010/0201488 A1 | 8/2010 | Stern et al. | |
| 2010/0201520 A1 | 8/2010 | Stern et al. | |
| 2010/0220894 A1 | 9/2010 | Ackley et al. | |
| 2010/0226530 A1 | 9/2010 | Lev | |
| 2010/0232712 A1 | 9/2010 | Tomita et al. | |
| 2010/0250351 A1 | 9/2010 | Gillenson et al. | |
| 2010/0250356 A1 | 9/2010 | Gillenson et al. | |
| 2010/0250359 A1 | 9/2010 | Gillenson et al. | |
| 2010/0252621 A1 | 10/2010 | Ito et al. | |
| 2010/0260426 A1 | 10/2010 | Huang et al. | |
| 2010/0271187 A1 | 10/2010 | Uysal et al. | |
| 2010/0296753 A1 | 11/2010 | Ito et al. | |
| 2010/0303348 A1 | 12/2010 | Tolliver et al. | |
| 2010/0308964 A1 | 12/2010 | Ackley et al. | |
| 2010/0327066 A1 * | 12/2010 | Khan | G06K 17/0022 235/462.01 |
| 2011/0000958 A1 | 1/2011 | Herzig | |
| 2011/0011936 A1 | 1/2011 | Morandi et al. | |
| 2011/0019220 A1 | 1/2011 | Kikuchi | |
| 2011/0019816 A1 | 1/2011 | Inami et al. | |
| 2011/0026081 A1 | 2/2011 | Hamada et al. | |
| 2011/0029363 A1 | 2/2011 | Gillenson et al. | |
| 2011/0034176 A1 | 2/2011 | Lord et al. | |
| 2011/0052008 A1 | 3/2011 | Holsing et al. | |
| 2011/0081948 A1 | 4/2011 | Shirai et al. | |
| 2011/0084808 A1 | 4/2011 | Tuttle | |
| 2011/0102642 A1 | 5/2011 | Wang et al. | |
| 2011/0115947 A1 | 5/2011 | Oh | |
| 2011/0115950 A1 | 5/2011 | Wach | |
| 2011/0128125 A1 | 6/2011 | Kai et al. | |
| 2011/0143811 A1 | 6/2011 | Rodriguez | |
| 2011/0155808 A1 | 6/2011 | Santos et al. | |
| 2011/0200256 A1 | 8/2011 | Saubat et al. | |
| 2011/0205387 A1 | 8/2011 | Tzur et al. | |
| 2011/0207531 A1 * | 8/2011 | Gagner | G07F 17/3248 463/30 |
| 2011/0210171 A1 | 9/2011 | Brown et al. | |
| 2011/0211726 A1 | 9/2011 | Moed et al. | |
| 2011/0212717 A1 | 9/2011 | Rhoads et al. | |
| 2011/0222757 A1 | 9/2011 | Yeatman, Jr. et al. | |
| 2011/0251093 A1 | 10/2011 | Xia et al. | |
| 2011/0280447 A1 | 11/2011 | Conwell | |
| 2011/0284625 A1 | 11/2011 | Smith et al. | |
| 2011/0290883 A1 | 12/2011 | Kotlarsky et al. | |

(56) References Cited

U.S. PATENT DOCUMENTS

| | | |
|---|---|---|
| 2011/0310442 A1 | 12/2011 | Popadic et al. |
| 2011/0311026 A1 | 12/2011 | Lalena |
| 2012/0037695 A1 | 2/2012 | Liu et al. |
| 2012/0047424 A1 | 2/2012 | Rothschild |
| 2012/0048920 A1 | 3/2012 | Iizaka |
| 2012/0063690 A1 | 3/2012 | Ashok et al. |
| 2012/0064971 A1 | 3/2012 | Devine et al. |
| 2012/0079544 A1 | 3/2012 | Massimino |
| 2012/0091204 A1 | 4/2012 | Shi |
| 2012/0221724 A1 | 8/2012 | Chor |
| 2013/0142444 A1 | 6/2013 | Qu et al. |
| 2013/0175335 A1 | 7/2013 | Roberts |
| 2013/0194077 A1 | 8/2013 | Vargas et al. |
| 2013/0277427 A1 | 10/2013 | Zumsteg et al. |
| 2013/0277430 A1 | 10/2013 | Zumsteg et al. |
| 2013/0278386 A1 | 10/2013 | Zumsteg |
| 2013/0278393 A1 | 10/2013 | Zumsteg |
| 2013/0306720 A1 | 11/2013 | Todeschini et al. |
| 2014/0001254 A1 | 1/2014 | Williams et al. |
| 2014/0014724 A1 | 1/2014 | Koziol et al. |

\* cited by examiner

HAND HELD BAR CODE READERS OR MOBILE COMPUTERS WITH CLOUD COMPUTING SERVICES

CROSS-REFERENCE TO RELATED APPLICATIONS

This application claims the benefit of U.S. patent application Ser. No. 14/467,262 for Hand Held Bar Code Readers or Computers With Cloud Computing Services filed Aug. 25, 2014 (and published Dec. 11, 2014 as U.S. Patent Publication No. 2014/0361073), now U.S. Pat. No. 9,223,860, which claims the benefit of U.S. patent application Ser. No. 13/941,908 for Hand Held Bar Code Readers or Mobile Computers With Cloud Computing Services filed Jul. 15, 2013 (and published Jan. 23, 2014 as U.S. Patent Application Publication No. 2014/0021256), now U.S. Pat. No. 8,820,630, which is a continuation of U.S. patent application Ser. No. 13/312,465 for Hand Held Bar Code Readers or Mobile Computers With Cloud Computing Services filed Dec. 6, 2011 (and published Jun. 6, 2013 as U.S. Patent Application Publication No. 2013/0140355), now U.S. Pat. No. 8,485,430 and is related to U.S. patent application Ser. No. 13/312,488 for Hand Held Bar Code Readers or Mobile Computers With Cloud Computing Services filed Dec. 6, 2011 (and published Jun. 6, 2013 as U.S. Patent Application Publication No. 2013/0142444). Each of the foregoing patent applications, patent publications, and patents is hereby incorporated by reference in its entirety.

FIELD OF INVENTION

The present invention relates to a system and method for utilizing the storage and CPU power of cloud computing to increase the efficacy and performance of a bar code reader on a mobile device.

BACKGROUND

Bar codes are graphical representations of data, the most common of which are referred to as one dimensional (1D) and two dimensional (2D) bar codes. ID bar codes are images that represent data by varying the widths and spacings of parallel lines. 2D bar codes are also images that represent data, but in addition to the parallel lines, or bars, a 2D bar code may contain rectangles, dots, hexagons and other geometric patterns in two dimensions. The data encoded in bar codes are interpreted by optical scanners and/or software.

Bar codes originally were scanned by special optical scanners called bar code readers; later, scanners and interpretive software became available on devices, including desktop printers and smart phones. Today, devices considered bar code readers include, but are not limited to: pen-type readers, laser scanners, CCD readers, camera-based readers, omni-directional bar code scanners, and cell phone cameras. Some of the leading manufacturers of smart phones offer bar code scanning software that can be installed on their respective smart phones. The goal of this software is to allow smart phone consumers to use their mobile devices to scan bar codes that they encounter, including but not limited to those on products in stores or on advertisements for products and/or services located in media such as magazines and posted in public places, such as bus stops.

After scanning a bar code using software installed on a smart phone, users can access the Internet to obtain information about the product, including but not limited to pricing and safety information. For example, information retrieved by a consumer can assist the consumer in finding the most competitive price for a product whose bar code the consumer scanned.

SUMMARY

An object of the present invention is to utilize cloud computing to provide a system and method that enables mobile devices to scan complex data encoded as a bar coded image and utilize the decoded data.

Another object of the present invention is to utilize cloud computing to enhance the detail of the bar codes that can be generated for use by mobile devices.

Another object of the present invention is to utilize cloud computing to provide a system and method for sending complex data encoded as bar coded images from one device to another in a manner that does not rely upon the memory of the devices.

In one embodiment of the present invention, rather than install the bar code scanning software on a smart phone or other mobile device, a smart phone can be utilized as an access point to the software through a thin client, while the processing occurs on the cloud. In this embodiment, all operations that demand more CPU power and/or storage than is traditionally available on a mobile device itself can be performed by the resources of the cloud.

By off-loading processing to cloud resources, the bar code technology is no longer limited by the resources of a physical mobile device or any terminal (e.g., encoded information reading (EIR) terminals configured to read bar codes and/or other types of encoded information). Unlike the hardware and software on an EIR terminal, the cloud's resources are virtually unlimited because the cloud's capabilities can be rapidly and elastically provisioned, in some cases automatically, to quickly scale out and rapidly released to quickly scale in. By installing the application on a cloud, the service provider can utilize the CPU power and storage of the cloud, which from an end user perspective, appears unlimited.

In this embodiment, once the processing is completed by the resources of the cloud, the decoded data can also be accessed by additional users of EIR terminals. In this manner, the cloud is being used for mobile-to-mobile communication. The first EIR terminal scans the bar code and the second "receives" the data by connecting to the central processing resource. The storage of the data is also handled by a resource of the cloud, but the second user connect through a thin client and views this data as if it were stored on his or her own terminal.

In another embodiment of the invention, the thin client on the EIR terminal can be used to encode a complex bar code image (or decode a semi-damaged or contaminative barcode using recovery algorithms) and store this image for further use. In this embodiment, a user of the EIR terminal enters data that is to be encoded into a bar code into a thin client on the EIR terminal. Rather than process the data and create the encoded bar code with software installed on the EIR terminal, the data entered is processed by the resources in the cloud. Additionally, the resultant image is stored on cloud resources. This image is accessible to the creator via the thin client on his or her EIR terminal. The EIR terminal user can direct the computing resources on the cloud to manage the image, for example, by sharing it with other users. The storage and CPU power on the smart phone need not be sufficient to support these operations because the bar codes are created using cloud resources and stored using cloud resources.

In this embodiment, once the processing is completed by the resources of the cloud, the encoded data, the bar code can also be accessed by additional users of EIR terminals. In this manner, the cloud is being used for mobile-to-mobile communication. The first EIR terminal user enters the data to be encoded and the second "receives" the bar code by connecting to the central processing resource. The storage of the bar code is also handled by a resource of the cloud, but the second user connect through a thin client and views this image as if it is were stored on his or her own terminal, In another embodiment of the invention, one EIR terminal can send a bar coded image to another EIR terminal by using the cloud as an invisible go-between in a mobile-to-mobile transaction. In this embodiment, when a first EIR terminal scans a bar coded image, rather than this EIR terminal sending the image to another EIR terminal for processing, or processing the image itself before sending it to another EIR terminal, both being operations which require CPU and storage, the bar coded image is processed outside of the EIR terminal and saved in the cloud. This bar coded image is made viewable by a second EIR terminal. Although the EIR terminal is "receiving" this bar coded image, by viewing an image stored on the computing resources of the cloud, the second EIR terminal's memory is not a limitation to whether this image can be "received" by the terminal.

The term bar code also refers to any item containing decodable indicia, including but not limited to a 1D bar code, a 2D bar code and/or one or more optical character recognition (OCR) symbols. Additionally, scanning an item also includes using any device to capture an image of the item, including but not limited to using a camera to capture an image of the item, and/or using a laser scanner to read an image with decodable indicia. Bar code readers, i.e. devices used to capture images containing decodable indicia, include, but are not limited to: pen-type readers, laser scanners, CCD readers, camera-based readers, omni-directional bar code scanners, and cell phone cameras. Some of the leading manufacturers of smart phones offer bar code scanning software that can be installed on their respective smart phones.

Although the present invention has been described in relation to scanning a bar code using an optical scanner, many other variations and modifications will become apparent to those skilled in the art. One such modification is using RFID tags instead of bar codes to house data. In this embodiment, the data on the RFID tags would be read by RFID readers on the EIR terminals. Further processing of the data would be off-loaded to an external data storage and processing system, such as a cloud.

DETAILED DESCRIPTION OF THE INVENTION

Figure 1:
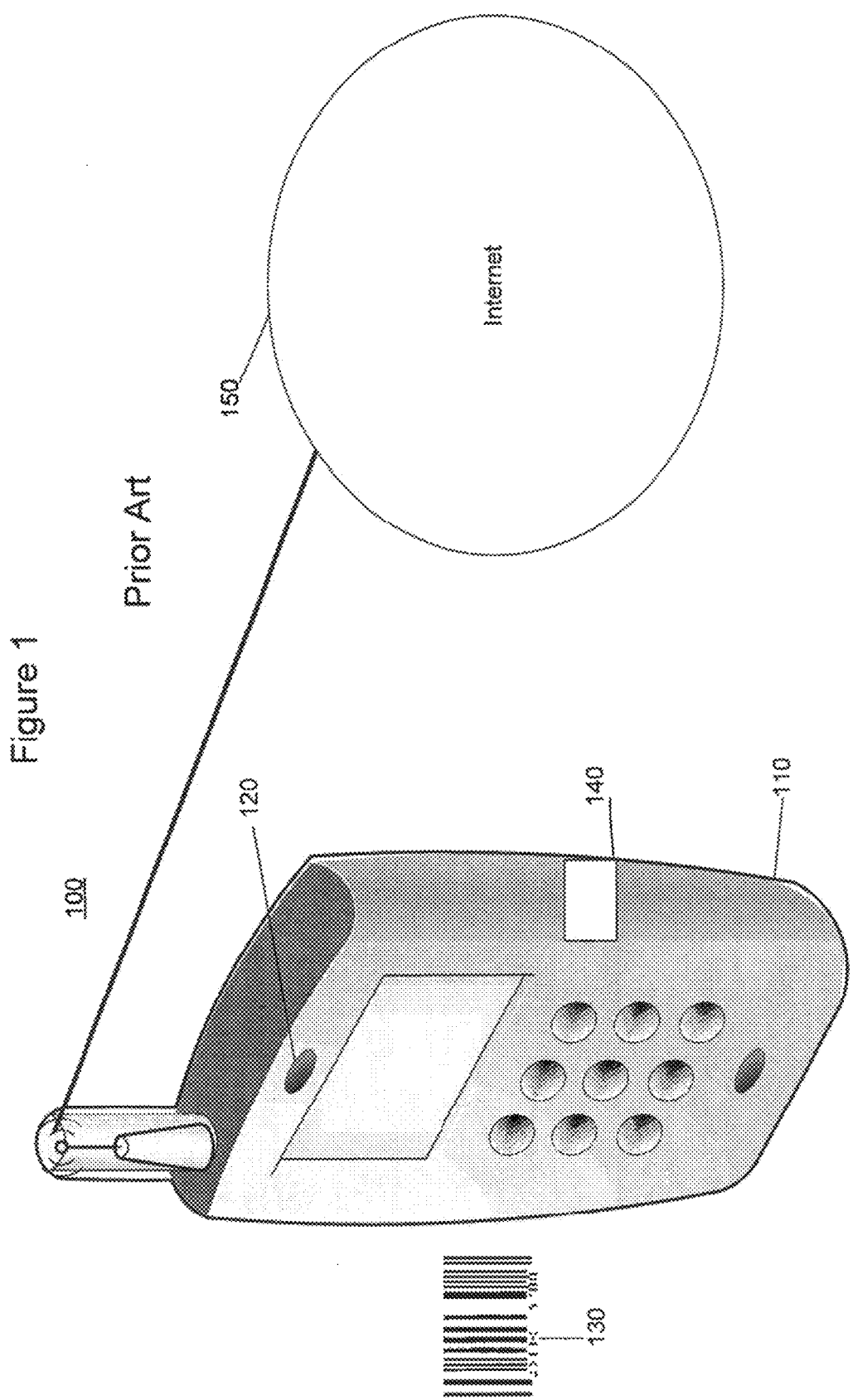
FIG. 1 depicts a technical architecture of an embodiment of the prior art.

The present invention provides a system and method for utilizing the storage and CPU power of cloud computing and/or any external data processing and storage system to increase the efficacy and performance of a bar code reader on a mobile device. When installed on a mobile device, such as a smart phone, bar code reading software and the data encoded in the bar codes themselves are both constrained by the physical attributes of the mobile device. The CPU power of the mobile device controls the detail of the data that can be processed and the memory of the mobile device controls the detail of data that can be stored. By off-loading the processing and storage onto the cloud, the CPU power and storage of the cloud result remove these constraints.

The limited CPU power of a mobile device, such as a smart phone, impacts both the scanning and decoding software. Working within the constraints of the CPU power of the mobile device, bar code scanning and decoding activities are either accomplished at an extremely slow processing speed, or the image that is being decoded, and/or the algorithm used to decode it, must be simplified to compensate for the limited CPU power. Imposing constraints upon the complexity of the image based upon the CPU power of the mobile device affects the quality of the image and therefore, the quantity and quality of the data that can be encoded in the bar code.

The limited memory of the mobile device also impacts the quantity and quality of information that can be encoded in a bar code because after a bar code is decoded, storing the data encoded in the bar code would require storage space in the mobile device's memory. Over the course of time, a user of a single mobile device could scan multiple bar codes and the storage demands of this data would quickly exceed the local storage capacity of the device.

The power and capacity limitations of the mobile device are presently detriments to the expansion and enhancement of bar code technology mobile devices and in mobile devices in general. The ability to utilize this technology is presently controlled by mobile device manufacturers.

A need therefore exists for an efficient way to utilize a mobile device to scan complex data encoded as a bar coded image and utilize the decoded data. It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. It is understood by one of ordinary skill in the art that any external data processing and storage system with these characteristics would also be included in this disclosure.

One characteristic of the cloud computing model is that a consumer can unilaterally provision computing capabilities, such as CPU power and storage capacity on the network, as needed automatically without requiring human interaction with the service's provider.

The resources of the cloud are available over the network and can be utilized by consumers using a custom thin client, a software application that uses the client-server model where the server performs all the processing, or a standard web browser, running on a user terminal, including but not limited to smart phones, touchpad computers, tablet computers, desktop, and mobile computers, such as laptops.

By taking advantage of the computing power of the cloud system, software providers have the capability to distribute software as a service (SaaS), meaning that a consumer uses a provider's applications running on a cloud's infrastructure. The applications are accessible to the consumer from various user terminals through a thin client interface such as a web browser e.g., web-based email).

By deploying software into a cloud, the software provider accesses processing, storage, networks, and other fundamental computing resources. The provider does not manage or control the underlying cloud infrastructure but has control over operating systems, storage, deployed applications, and possibly limited control of select networking components (e.g., host firewalls).

The cloud computing model allows services to be delivered through shared data centers that can appear as a single point of entry, or a communications gateway, for a terminal accessing the cloud. For example, a user accessing an application as a service or a platform as a service may use a web browser to connect to a URL. At that URL, the user gains access to the cloud. While accessing the cloud through the web browser, the user will not be aware of the computers or networks that are serving the application and/or platform that the user is accessing. It could be a single computer or an elaborate network. This is not important to the user, as the owner of the cloud works to provide the user with the cloud services seamlessly.

Because the user relies upon the computing power of the cloud and not upon that of the terminal he or she is using to access the cloud, this model is device independence. By utilizing the cloud to provide applications and platforms as a service, the specifications of the device or terminal used to connect to the cloud are non-limiting.

Referring to FIG. 1, the technical architecture 100 of an embodiment of the prior art used to scan bar codes using an EIR terminal 110 includes an installed application on an EIR terminal 110. An image capture device, such as a camera 120, scans and/or captures an image of decodable indicia, such as a bar code 130 using the CPU 140 in the physical EIR terminal 110. The image of decodable indicia can be provided by a raw image byte stream, a compressed image byte stream, and/or a partial compressed image byte stream. The data embedded in the bar code 130, is then extracted and saved to the memory 140 of the EIR terminal 110. This data can be transmitted to the Internet 150 via the network connection of the EIR terminal 110.

Figure 2:
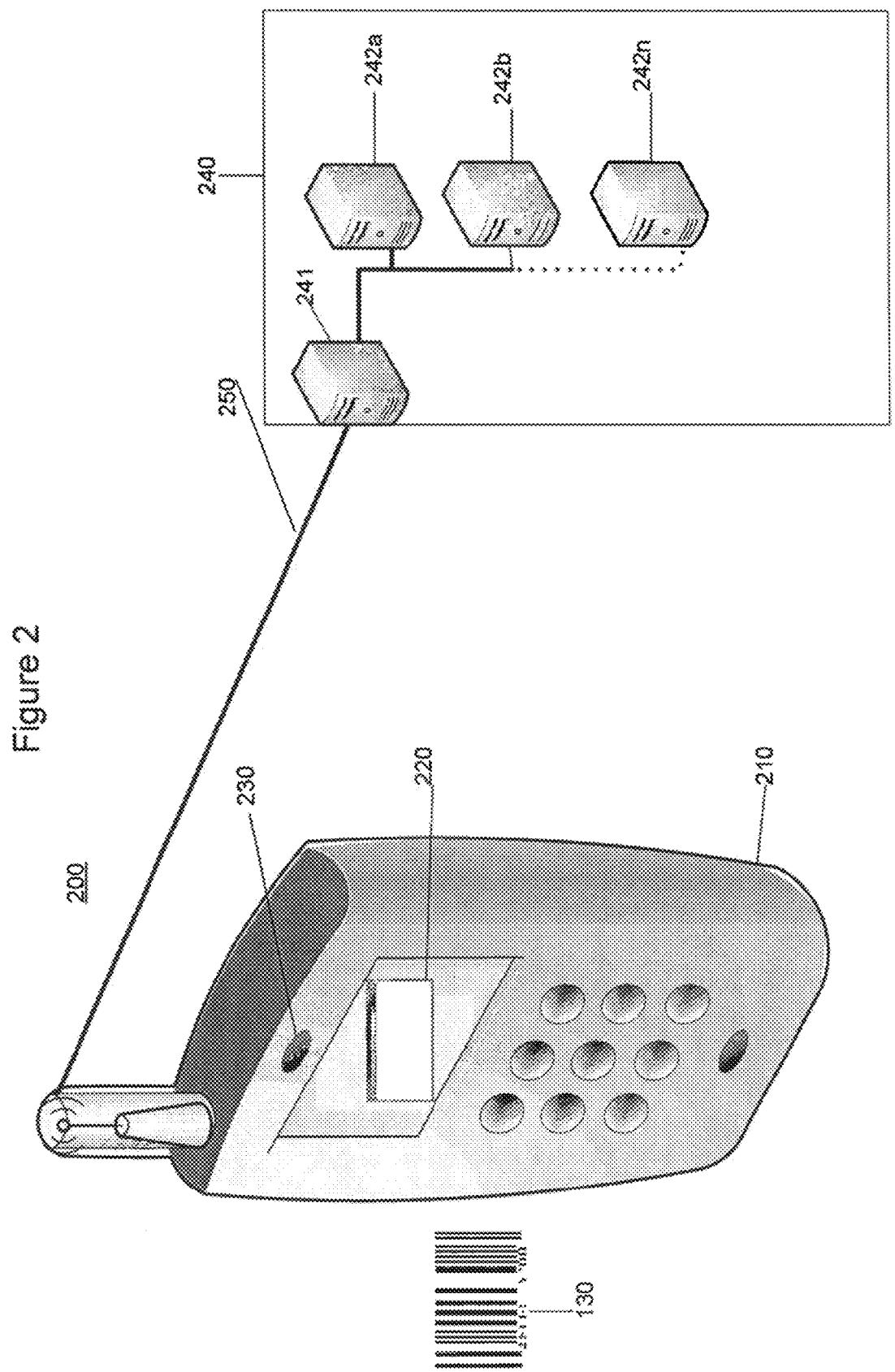
FIG. 2 depicts a technical architecture of an embodiment of the present invention.

Referring to FIG. 2, the technical architecture 200 of an embodiment of the claimed system used to practice the method of the invention includes an EIR terminal 210 running a thin client 220, such as a web browser, which serves as the graphical user interface (GUI), also called the front end. The EIR terminal includes a decodable indicia capture hardware 230, including but not limited to a camera. The EIR terminal 210 connects to a data processing and storage system 240, such as a cloud, over a network 250.

The data processing and storage system 240 in this embodiment includes but is not limited to, a server-side proxy component 241 at least two back-end computers 242a, 242b, 242n, which contain the computing and storage resources of the data processing and storage system 240. In FIG. 2, the resources of the data processing and storage system 240 are located in the same physical facility. However, in additional embodiments of the present invention, the resources of the data processing and storage system 240 are spread out over at least two different physical locations.

The network 250 connecting the EIR terminal 210 to the data processing and storage system 240 includes but is not limited to a public network, a virtual private network (VPN), a local area network (LAN), a wide area network (WAN), wireless LAN, wireless WAN, wireless PAN and/or the Internet.

Installed on the application server resources of the data processing and storage system 240, is the back end software that performs operations that require processing utilizing processor resources in the data processing and storage system. Data processed when the software is executed on the processor(s) are saved in the storage resources of the data processing and storage system and/or can be further utilized by the application server resources of the data processing and storage system 240 to interact with servers internal and external to the data processing and storage system 240 (not pictured). For example, a server running a billing system may be internal or external to the data processing and storage system 240. As a result of the data processing in the data processing and storage system 240, data may be returned to the EIR terminal 210 and can render in the thin client 220.

Figure 3:
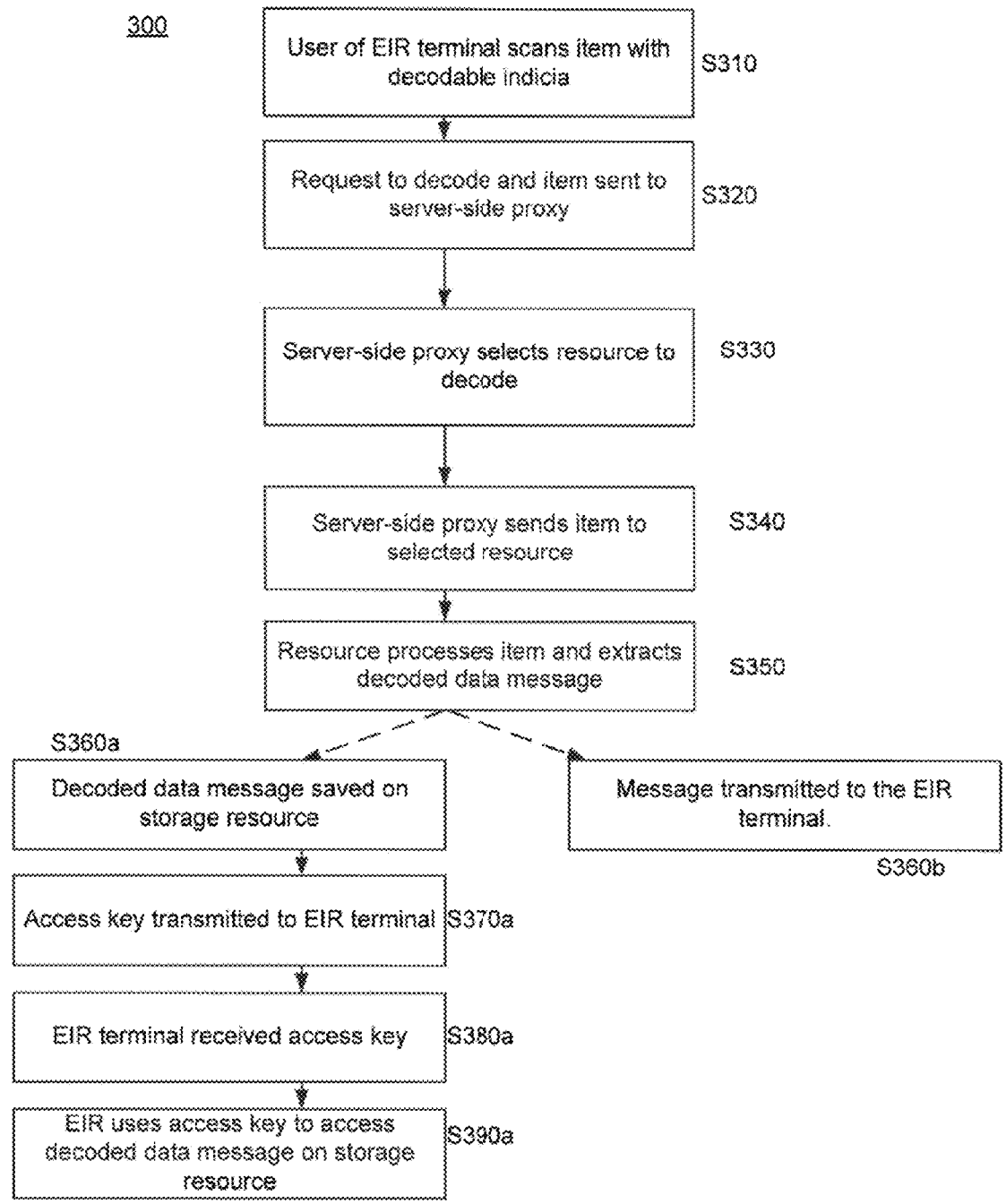
FIG. 3 depicts the workflow of an embodiment of the present invention.

FIG. 3 depicts an embodiment of the workflow in the claimed system and method 300, First, a user of an EIR terminal scans an item including decodable indicia using optical scanning hardware and/or a thin client on the EIR terminal (S310). Alternatively, the user may use an image capture device, including but not limited to a camera to capture the image of this item. This item includes but is not limited to a 1D bar code, a 2D bar code and/or one or more optical character recognition (OCR) symbols.

After the item is scanned or captured, this item, and a request to decode this item, is sent to a server-side proxy of the data processing and storage system in a format including but not limited to a raw image bitstream, a compressed byte bitstream, and/or a partial compressed image byte stream (S320). A compressed image bitstream includes but is not limited to a TIFF byte stream, a GIF byte stream, a JPEG byte stream, or MPEG byte stream.

Once the server-side proxy receives the request, it selects a resource in the data processing and storage system that will decode the item (S330). In the embodiment of FIG. 1, these resources were at least two back-end computers. The server-side proxy selects the appropriate resource using a selection process which includes but is not limited to pre-defined rule, load estimates for the resources in the data processing and storage system, the estimated network throughputs across network paths to each of the resources in the system. Types of pre-defined rules include but are not limited to round-robin selection and random selection.

Once the resource has been selected (S330), in this embodiment, the item is sent to the selected resource (S340). The resource processes the item and extracts a message (decoded data) from the item (S350).

For security purposes, in another embodiment of the present invention, the selected resource authenticates the EIR terminal before processing the request. The resource can also establish a communication session with the EIR terminal. In one embodiment of the present invention, the communication is supported using one or more of the following: HTTP cookies, dynamic URLs. In another embodiment of the present invention, the resource is configured to communicate using SOAP protocol/socket protocol.

Once the data is extracted, i.e., the message, is optionally saved on a storage resource, such as the non-volatile memory, of the data processing and storage system (S360a). The message may also be transmitted to the client (S360b).

In an embodiment of the present invention, when the message is saved, an access key is sent to the EIR terminal (S370a). The EIR terminal receives the access key (S380a) and a user of the EIR terminal uses the access key to view the message, which is stored on a resource of the data processing and storage system, through a thin client on the EIR terminal (S390a). Alternatively, the access key can be sent to a different EIR terminal (S370b). The user of this EIR terminal receives the access key (S380a) and uses the access key to view the message (S390a).

In an embodiment of the invention, no access key may be necessary to view the message once it has been saved in the data processing and storage system.

In another embodiment of the invention, a user may be prompted to enter security credentials before viewing the saved message and/or the image.

This data can also be sent to additional resources, both internal and external to the data processing and storage system for further processing (S360b). The results of the processing can be saved in the storage resources of the data processing and storage system (S370) and/or populated in the thin client on the EIR terminal (S370) to be viewed by the user and/or another user of a separate EIR terminal. In an embodiment of the present invention, users may be required to enter credentials, such as a password, to access the results.

Figure 4:
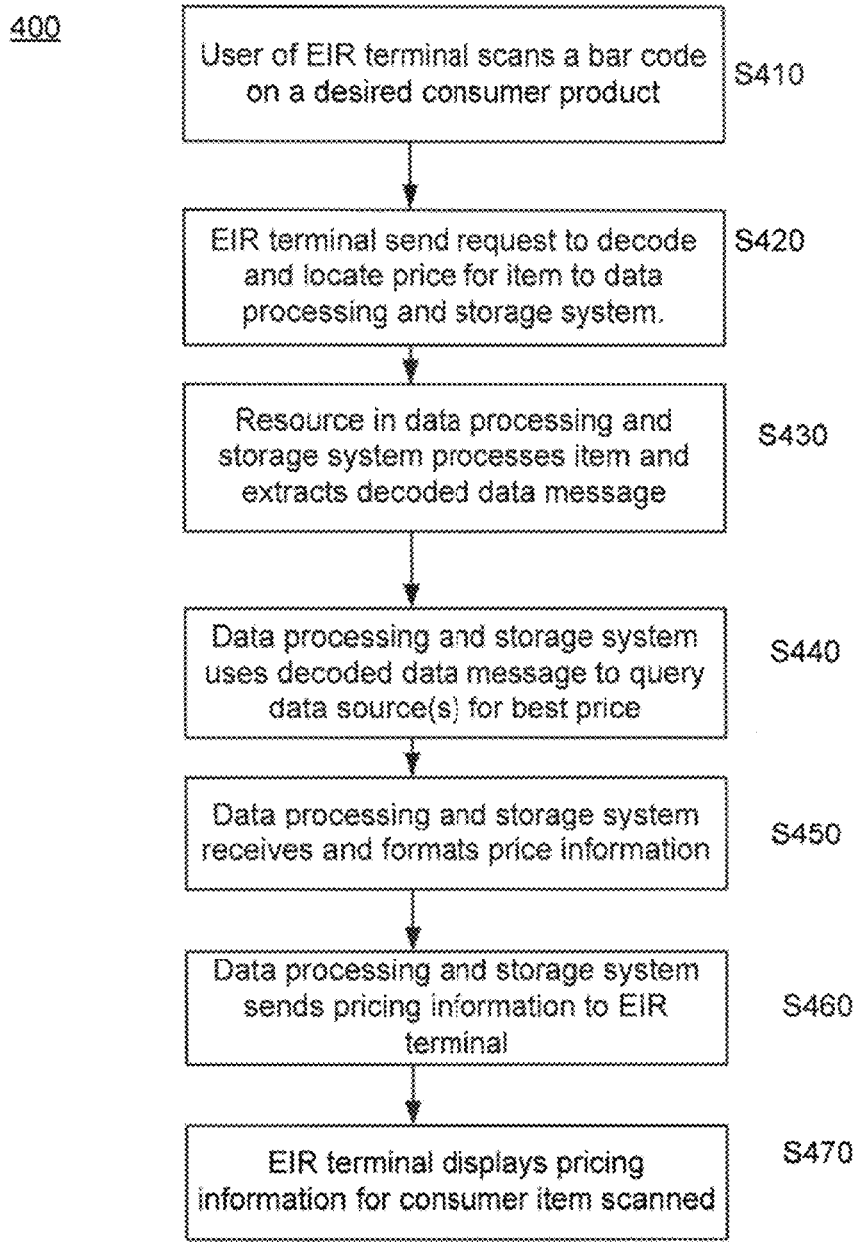
FIG. 4 depicts the workflow of an example of an embodiment of the present invention.

FIG. 4 depicts a workflow of the present invention when applied to the task of assisting a consumer in finding the best price for a product after the consumer scans a bar code appearing on the desired product 400. First, a consumer with an EIR terminal uses the device to scan the bar code on a product (S410). The bar code scanning software on the EIR terminal is limited to a thin client. This thin client communicates over the network with the back end application, which is installed on a resource or a group of resources in the data processing and storage system, i.e. the cloud (S420). The back end application on the system decodes the bar code to extract information describing the product with which the bar code is associated (S430). This application queries a data source, or a variety of data sources, that can be located in the system or external to the system, to locate the best price for the product (S440). The query can be formulated in a variety of query languages, including but not limited to SQL and HTSQL.

Once the pricing information is returned, the application processes the data so it can be presented in a user friendly manner by the thin client (S450). The application sends the data to the EIR terminal (S460). The thin client displays the location of the best price of the item scanned to the user (S470).

Many EIR terminals, such as smart phones, contain mobile phone tracking software which utilizes the multilateration of radio signals between (several) radio towers of the network and the phone, and/or the global positioning system (GPS) to attain the position of the terminal whether it is stationary or moving.

In the embodiment of FIG. 4, mobile phone tracking information, such as GPS coordinates, can be utilized by the data processing and storage system in addition to the bar code in order to locate the best price for an item. When the thin client communicates with the back-end application (S420), the coordinates of the EIR terminal are broadcast to the back-end application as well. By using the location of the EIR terminal, the application queries the data source for the best price for a product within a given radius of the EIR terminal, for example within a five mile radius (S440). The pricing information returned to the EIR terminal (S450) is more relevant because if the best price for an item is over a hundred miles away, commuting to that destination to get that price may negate any cost savings.

In an embodiment of the invention, the handling instructions regarding the decoded message may be encoded in the bar code. Thus, when the data processing and storage system locates and decodes the decodable indicia within the image, a resource of the data processing and storage system then executes these instructions. Handling instructions include but are not limited to instructions to save the decoded message to a resource in the data processing and storage system, instructions to send the decoded message to the EIR terminal, instructions to send the decoded message to a node that is external to the data processing and storage system, instructions to direct the thin client in the EIR terminal to access a URL.

In one embodiment of the present invention, a URL is encoded in the bar code. In this embodiment, when the data storage and processing system decodes the image of decodable indicia, the thin client on the EIR terminal is directed to the encoded URL. One example of a use for this model is when the user of an EIR terminal sees an advertisement for a product at a bus stop or possibly in a magazine. The advertisement would feature a bar code. The user scans this bar code with his or her EIR terminal and is seamlessly directed to a web site where he or she accesses more information about the product and has the opportunity to purchase the product.

Figure 5:
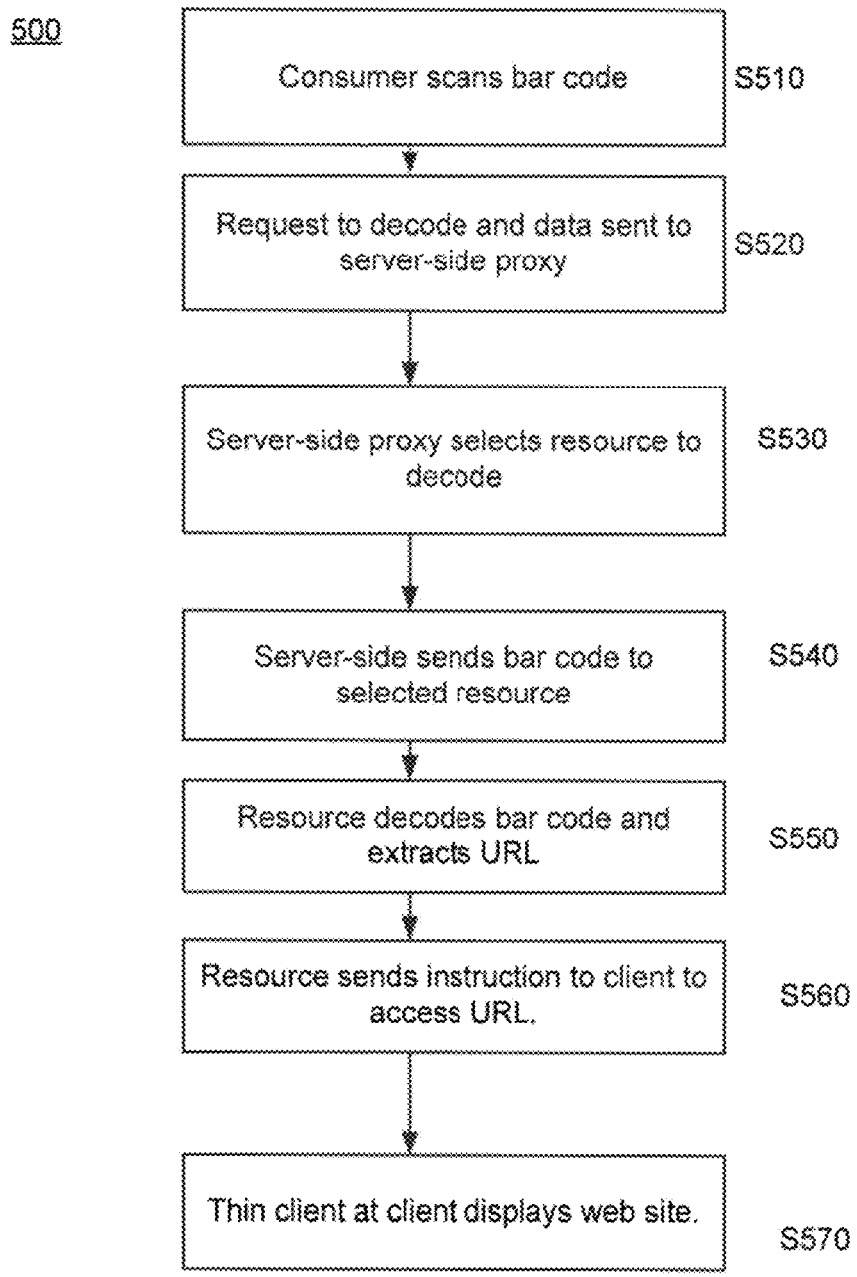
FIG. 5 depicts a workflow of an embodiment of the present invention.

FIG. 5 depicts the workflow of the present invention when a URL is encoded in the bar code 500. First, a consumer with an EIR terminal uses the device to scan the bar code in an advertisement (S510). The EIR terminal sends the bar code to a server-side proxy, a gateway to the data processing and storage system, the cloud (S520). The server-side proxy then selects a resource to decode the bar code (S530) and sends the bar code to the selected resource (S540). The resource decodes the image of decodable indicia, the bar code, extracting a URL (S550) The resource sends an instruction to the EIR terminal to access the URL (S560). The thin client on the EIR terminal connects to the URL and displays the web site that it represents (S570).

Depending upon the data encoded in a bar code, a user may desire an additional level security to protect the data that is encoded. In an embodiment of the present invention, the data in the bar code is encrypted. Thus, in addition to decoding the bar code, resources of the data processing and storage system, such as a cloud, decrypt the image before decoding the data, providing a security validation. After decrypting and decoding the bar code, the data processing and storage system takes action according to pre-determined rules and/or according to the action encoded in the barcode image. In one embodiment of the present invention, the data processing and storage system does not transmit the actual decode result to the EIR terminal for security reasons.

Figure 6:
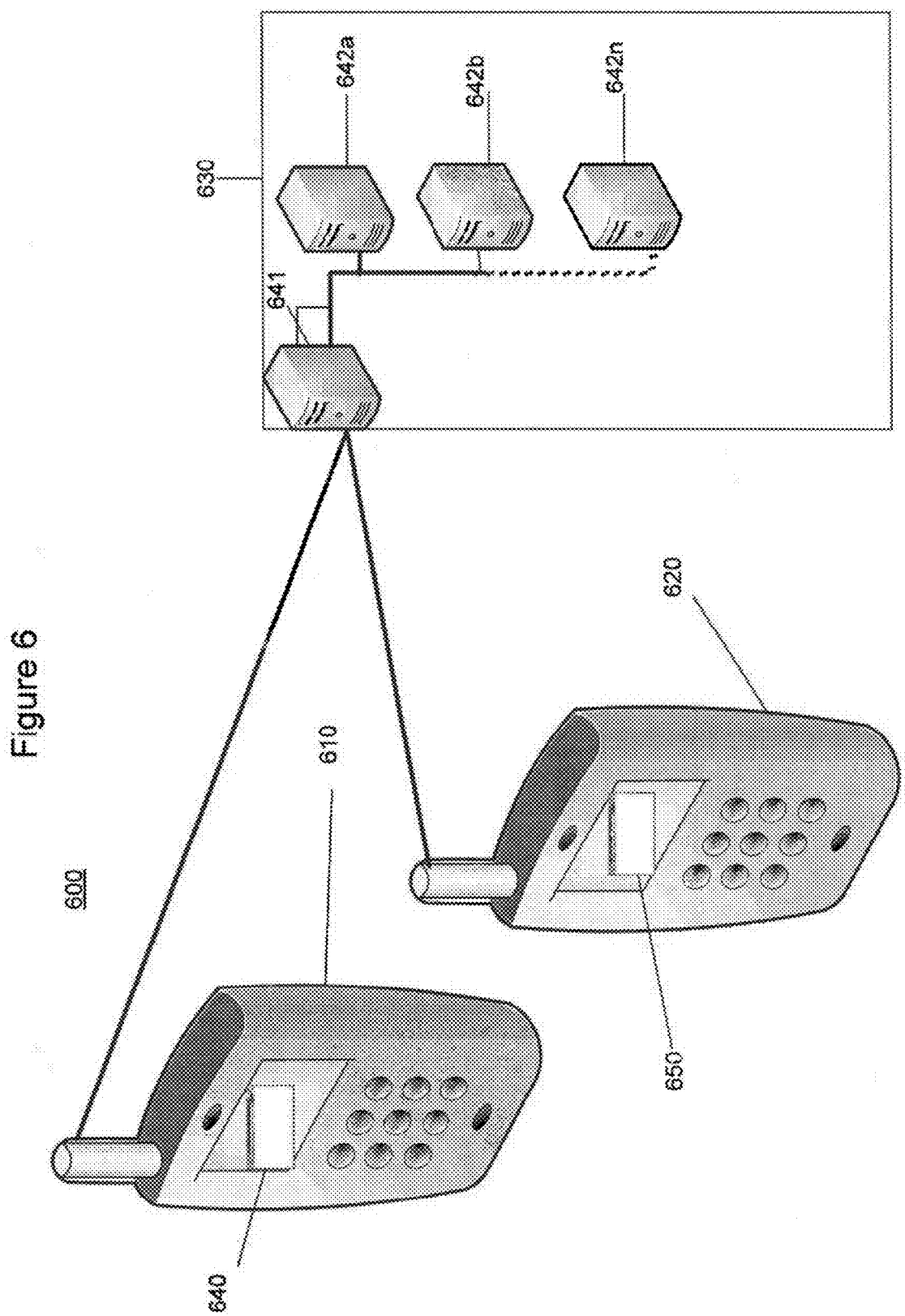
FIG. 6 depicts a technical architecture of an embodiment of the present invention.

An embodiment of the present invention can also assist consumers in communicating with each other. Mobile to mobile communication is facilitated through the use of the present invention. FIG. 6 depicts an exemplary technical architecture of an embodiment of the present invention as utilized to facilitate communication between two EIR terminals, including two mobile devices.

Referring to FIG. 6, the technical architecture of this embodiment 600 includes a first EIR terminal 610 and a second EIR terminal 620. Using a thin client 640 as a connection point, the first EIR terminal can be used to scan a bar code using the workflows discussed in the embodiment of FIG. 3. By offloading processing and storage to the network processing and storage system 630, the first EIR terminal can "share" the bar coded image, or the data encoded in a bar coded image, with a second terminal 620. The second EIR terminal 620, accesses the network processing and storage system 630 through a thin client 650 and although the EIR terminal 620 is accessing the system 630, it receives the content through the system 630 that it was sent by the first EIR terminal 610.

Figure 7:
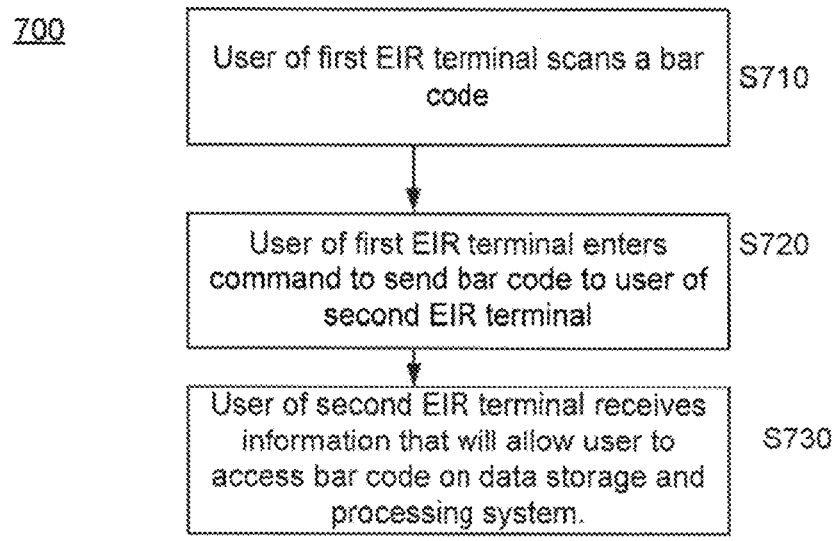
FIG. 7 depicts a workflow of an embodiment of the present invention.

For example, as shown in the workflow of FIG. 7, 700, the user of the first EIR terminal 610 takes a picture of a bar code (S710) and enters a command on the EIR terminal 610 to send the bar coded image to the user of the second EIR terminal 620 (S720). Rather than store the bar coded image on the internal hardware of the first EIR terminal 610, in a manner, that is seamless to the user, When the image is captured by the first EIR terminal 610, the image is actually stored on the system 630 (S710). The user of the second EIR terminal 620 appears to receive the bar coded image on the second EIR terminal 620 (S730). In reality, the bar coded image is stored on the system 630, but the second EIR terminal 620 merely received information, such as a URL, that gave this EIR terminal 620 a point of access to use to view the bar coded image on the system 630 using a thin client 650 on the second EIR terminal 620 (S730).

In addition to decoding bar codes, the technical architecture of FIG. 2 can also be utilized to perform the method of encoding data into bar codes. Referring to FIG. 2, the thin client 220 on the EIR terminal 210 is a GUI that allows users to enter data. The data is transmitted to be encoded by back end software that resides on resources 242a-242n in the data processing and storage system 240. The resultant bar code is stored on the storage resources of the data processing and storage system 242a-242n.

Figure 8:
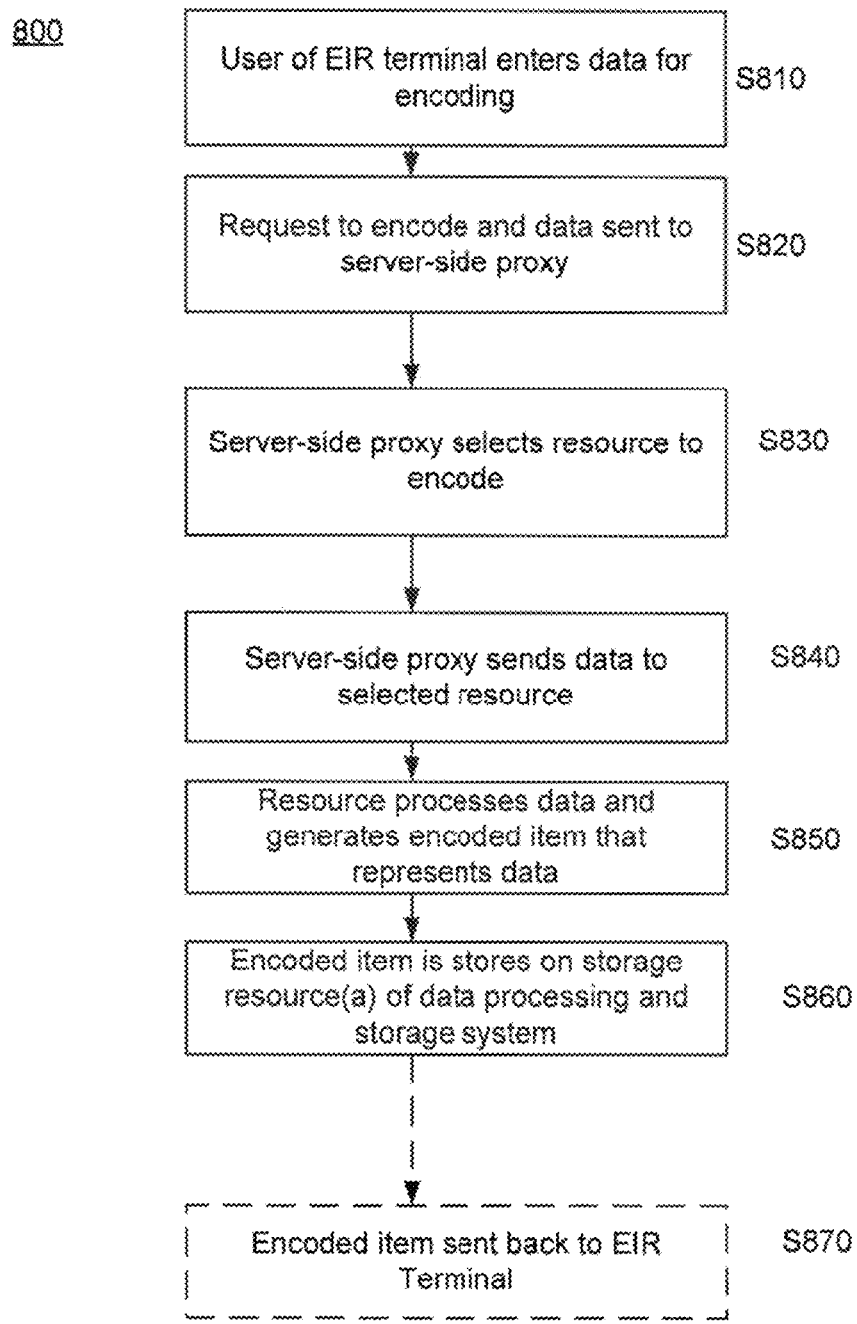
FIG. 8 depicts a workflow of an embodiment of the present invention.

FIG. 8 depicts the workflow 800 of this embodiment of the present invention. First, a user enters data into a thin client 220 on an EIR terminal (S810). This data and a request to encode are then transmitted by the EIR terminal to the server-side proxy in the data processing and storage system (S820). The server-side proxy selects a resource to generate an item with decodable indicia, such as a bar code, from the data entered (S830). The server-side proxy selects the appropriate resource using a selection process which includes but is not limited to pre-defined rule, load estimates for the resources in the data processing and storage system, the estimated network throughputs across network paths to each of the resources in the system. Types of pre-defined rules include but are not limited to round-robin selection and random selection.

The server-side proxy sends the data to the resource it selected (S840). The selected resource then generates an encoded item that is representative of the data (S850).

In this embodiment, the encoded item, such as a bar code, is then stored on the storage resources of the system (S860) where it can be accessed by the users and by applications internal and external to the system. Optionally, the encoded item created is sent back to the EIR terminal (S870).

Figure 9:
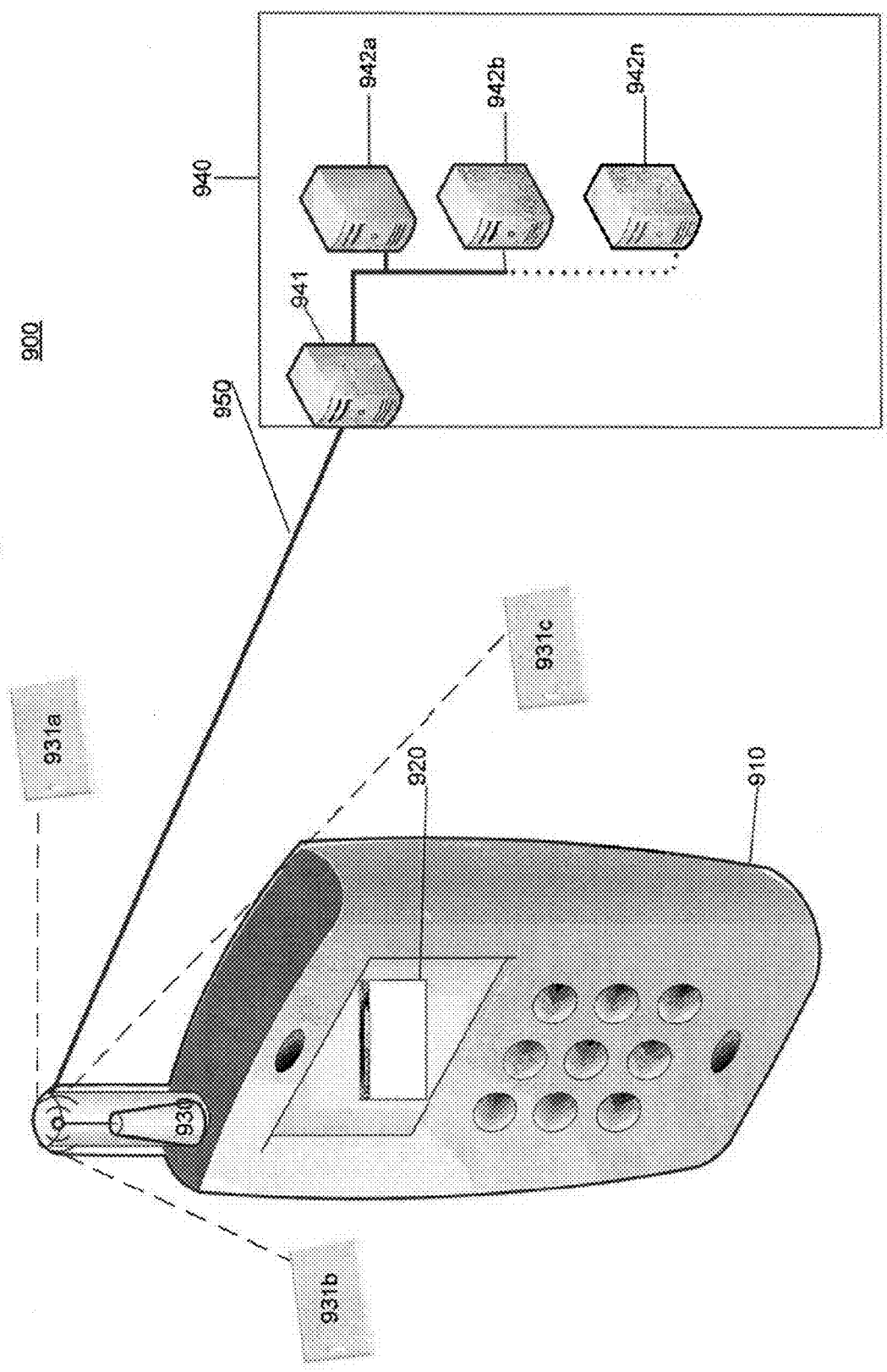
FIG. 9 depicts a technical architecture of an embodiment of the present invention.

In the embodiment of FIG. 9, rather than rely on individual EIR terminal owners to scan bar codes, EIR terminals may be equipped with RFID module and antennae that "read" RFID tags that the EIR terminal user comes into contact with during the day. This passive collection of RFID information could aid merchants in collecting marketing data that could assist in, among other things, effectively marketing to certain demographics.

Referring to FIG. 9, a technical architecture 900 of this embodiment includes an EIR terminal 910 equipped with an REID 930 receiver and is running a thin client 920, such as a web browser, which serves as the graphical user interface (GUI), also called the front end. The EIR terminal 910 connects to a data processing and storage system 940, such as a cloud, over a network 950.

The data processing and storage system 940 in this embodiment includes but is not limited to, a server-side proxy component 941 at least two back-end computers 942a, 942b, 942n, which contain the computing and storage resources of the data processing and storage system 940. In FIG. 9, the resources of the data processing and storage system 940 are located in the same physical facility. However, in additional embodiments of the present invention, the resources of the data processing and storage system 940 are spread out over at least two different physical locations.

The network 950 connecting the EIR terminal 910 to the data processing and storage system 940 includes but is not limited to a public network, a virtual private network (VPN), a local area network (LAN), a wide area network (WAN), wireless LAN, wireless WAN, wireless PAN and/or the Internet/

Installed on the application server resources of the data processing and storage system 940, is the back end software that performs operations that require processing utilizing processor resources in the data processing and storage system. Data processed when the software is executed on the processor(s) are saved in the storage resources of the data processing and storage system and/or can be further utilized by the application server resources of the data processing and storage system 940 to interact with servers internal and external to the data processing and storage system 940 (not pictured). As a result of the data processing in the data processing and storage system 940, data may be returned to the EIR terminal 910 and can render in the thin client 920.

in this embodiment, the MD receiver 930 on the EIR terminal 910 reads the data on RFID tags, 931a, 931b, 931c that it comes into contact with, i.e., that the user of the EIR terminal passes. The RFID receiver 930 collects the data from the tags. Rather than process the data at the EIR terminal 910, the EIR terminal 910 routes the raw data to the data processing and storage system 940. The server-side proxy receives the request to process the data and selects a resource within the system 940, such as 942a, 942b, 942n, to fulfill the request. The selected resource processes the data and returns the results to the EIR terminal 910, which displays the results in the thin client 920.

The embodiments of FIGS. 2, 6 and 9 contain one or more EIR terminals 210, 610, 620, 910, a server-side proxy 241, 641, 941 and back-end computers 242a-n, 642a-n, 942a-n. In these embodiments, the server-side proxy server and the back-end computers comprise the data processing and storage systems 240, 640, 940. The EIR terminals and the enumerated resources of the data processing and storage systems are all individually computer systems 1000, as illustrated in FIG. 10.

Figure 10:
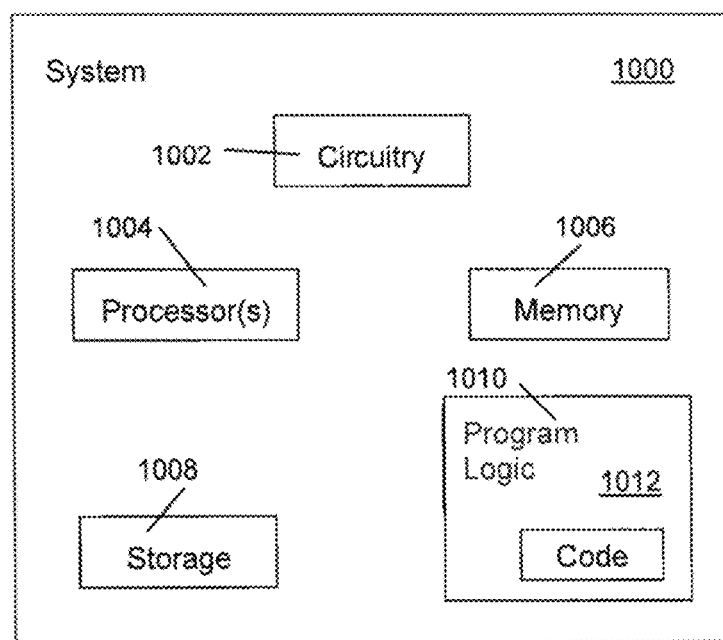
FIG. 10 depicts an embodiment of a computer system in incorporating one or more aspects of the present invention.

FIG. 10 illustrates a block diagram of a computer system 1000 which is part of the technical architecture of certain embodiments of the present invention. The system 1000 may include a circuitry 1002 that may in certain embodiments include a microprocessor 1004. The computer system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the microprocessor 1004 or circuitry 1002.

In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 11:
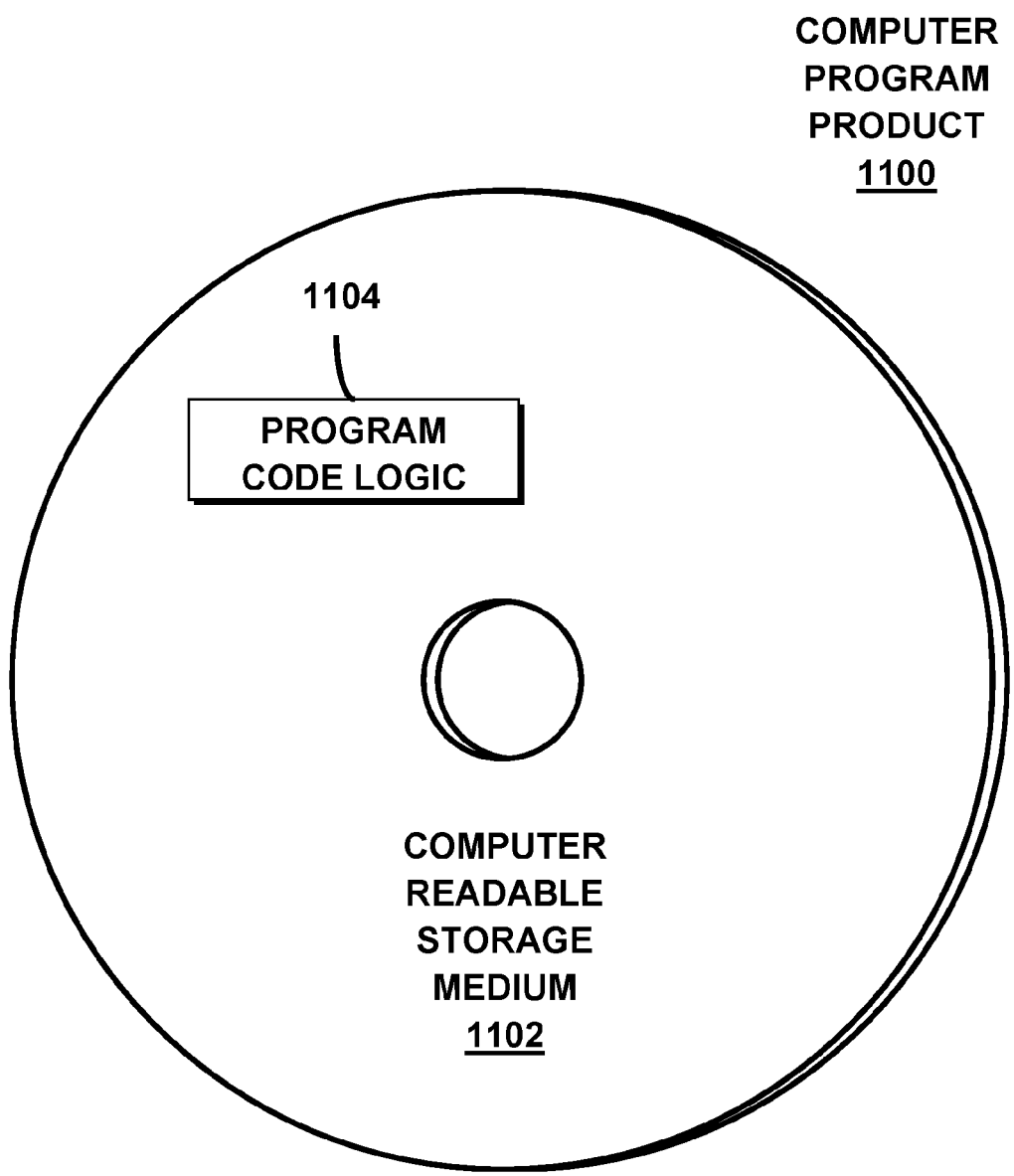
FIG. 11 depicts an embodiment of a computer program product incorporating one or more aspects of the present invention.

Using the processing resources of a data processing and storage system, such as a cloud, to execute software, computer-readable code or instructions, does not limit where this code is can be stored. Referring to FIG. 11, in one example, a computer program product 1100 includes, for instance, one or more non-transitory computer readable storage media 1102 to store computer readable program code means or logic 1104 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages, The program code may execute entirely on one resource of a data processing and storage system, such as a cloud, partly on various resources, and/or partly on the DR terminal and partly on one or more resources of the data processing and storage system.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must he retrieved from bulk storage during execution.

Input/Output or I/O devices including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:

1. A system, comprising:
a network gateway configured as a server-side proxy connecting a client and a plurality of back-end computers;
wherein the server-side proxy component is configured, responsive to receiving an encoding request comprising raw data from a client, to select a back-end computer from the plurality of back-end computers to which the encoding request should be forwarded;
wherein the server-side proxy component is configured to select the back-end computer from the plurality of back-end computers based on one or more factors comprising a pre-defined rule, load estimates for the plurality of back-end computers, and estimated network throughputs across network paths to each of the plurality of back-end computers; and
wherein the selected back-end computer is configured, responsive to receiving encoding request, to encode the encoding request into an image of decodable indicia.

2. The system of claim 1, wherein the client is an encoded information reading (EIR) terminal comprising an RFID receiver configured to output the encoding request.

3. The system of claim 1, wherein the selected back-end computer is configured, responsive to successfully encoding the encoding request into the image of decodable indicia, to transmit the image of decodable indicia to the client.

4. The system of claim 1, wherein the selected back-end computer is configured, responsive to successfully encoding the encoding request into the image of decodable indicia, to store in a non-volatile memory the image of decodable indicia and/or the encoding request.

5. The system of claim 4, wherein the selected back-end computer is configured to, upon receipt of security credentials, grant access to the image of decodable indicia and/or the encoding request.

6. The system of claim 1, wherein the image of decodable indicia comprises a 1D bar code, a 2D bar code, and/or an OCR symbol.

7. The system of claim 1, wherein the selected back-end computer is configured, responsive to receiving the encoding request, to authenticate the client.

8. The system of claim 1, wherein the selected back-end computer is configured, responsive to receiving the encoding request, to establish a communication session with the client, wherein the communication session is supported using HTTP cookies and/or dynamic URLs.

9. A method, comprising the steps of:
transmitting a request comprising raw data from a client device to a network gateway configured as a server side proxy component that communicates with a computer;
receiving, with the computer, the request from the server-side proxy component, wherein the request was routed to the computer based on one or more factors comprising a pre-defined rule, load estimates for the computer, and estimated network throughputs across network paths to the computer; and
encoding, with the computer, the request into an image of decodable indicia comprising a 1D bar code, a 2D bar code, and/or an OCR symbol.

10. The method of claim 9, wherein the client is an encoded information reading (EIR) terminal comprising an RFID receiver configured to output the request.

11. The method of claim 9, comprising transmitting, with the computer, the image of decodable indicia to the client, wherein the image of decodable indicia comprises a raw image byte stream, a compressed image byte stream, and/or a partial compressed image byte stream.

12. The method of claim 9, comprising storing, with the computer, the image of decodable indicia.

13. The method of claim 9, comprising:
in response to receiving the request, authenticating, with the computer, the client; and
in response to authenticating the client, initiating, with the computer, a communication session, wherein the communication session is supported using HTTP cookies and/or dynamic URLs.

14. A method, comprising the steps of:
transmitting, using a thin client on a client device, a request comprising raw data from the client device to a network gateway configured as a server side proxy component that communicates with a computer;
receiving, with the computer, the request from the server-side proxy component, wherein the request was routed to the computer based on one or more factors comprising a pre-defined rule, load estimates for the computer, and estimated network throughputs across network paths to the computer; and
encoding, with the computer, the request into an image of decodable indicia comprising a 1D bar code, a 2D bar code, and/or an OCR symbol.

15. The method of claim 14, wherein the client device is an encoded information reading (EIR) terminal comprising an RFID receiver configured to output the request.

16. The method of claim 14, transmitting, with the computer, the image of decodable indicia to the client device, wherein the image of decodable indicia comprises a raw image byte stream, a compressed image byte stream, and/or a partial compressed image byte stream.

17. The method of claim 14, comprising storing, with the computer, the image of decodable indicia.

18. The method of claim 14, comprising:
in response to receiving the request, authenticating, with the computer, the client device; and
in response to authenticating the client device, initiating, with the computer, a communication session, wherein the communication session is supported using HTTP cookies and/or dynamic URLs.

19. The method of claim 14, comprising:
capturing the raw data with the client device;
transmitting, with the thin client on the client device, the captured raw data to the computer;
receiving the transmitted, captured raw data on the computer;
storing the received, transmitted, captured raw data on the computer;
accessing, with a second thin client on a second client device, the stored, received, transmitted, captured raw data.

20. The method of claim 14, comprising:
transmitting, with the computer, an access key to the client device;
receiving, with the client device, the transmitted access key; and
viewing, with the thin client on the client device, a message on the computer using the received, transmitted access key.

* * * * *